United States Patent
Choi et al.

(10) Patent No.: US 10,481,743 B2
(45) Date of Patent: Nov. 19, 2019

(54) HIGH-PERFORMANCE TOUCH SENSOR AND MANUFACTURING METHOD THEREOF

(71) Applicant: DONGWOO FINE-CHEM CO., LTD., Iksan-si, Jeollabuk-do (KR)

(72) Inventors: Yong Seok Choi, Yongin-si (KR); Jae Hyun Lee, Uiwang-si (KR)

(73) Assignee: Dongwoo Fine-Chem Co., Ltd., Iksan-si (KR)

( * ) Notice: Subject to any disclaimer, the term of this patent is extended or adjusted under 35 U.S.C. 154(b) by 40 days.

(21) Appl. No.: 15/907,976

(22) Filed: Feb. 28, 2018

(65) Prior Publication Data

US 2018/0246599 A1    Aug. 30, 2018

(30) Foreign Application Priority Data

Feb. 28, 2017    (KR) .......................... 10-2017-0026052

(51) Int. Cl.
*G06F 3/044* (2006.01)
*G06K 9/00* (2006.01)
*G01B 7/34* (2006.01)

(52) U.S. Cl.
CPC ............ *G06F 3/044* (2013.01); *G01B 7/34* (2013.01); *G06K 9/0002* (2013.01); *G06F 2203/04103* (2013.01)

(58) Field of Classification Search
CPC ......... G09G 3/044; G01B 7/34; G06K 9/0002
See application file for complete search history.

(56) References Cited

U.S. PATENT DOCUMENTS

| 6,370,965 B1 * | 4/2002 | Knapp | G06K 9/00053 |
| | | | 73/780 |
| 2012/0319990 A1 * | 12/2012 | Chan | G06F 3/044 |
| | | | 345/174 |
| 2013/0154979 A1 | 6/2013 | Li et al. | |
| 2013/0194071 A1 * | 8/2013 | Slogedal | G06K 9/0002 |
| | | | 340/5.82 |

(Continued)

FOREIGN PATENT DOCUMENTS

| CN | 10295594 A | 3/2013 |
| CN | 103839959 A | 6/2014 |

(Continued)

OTHER PUBLICATIONS

Office Action from counterpart Korean Application No. 10-2017-0026052, and its English Translation, dated Nov. 21, 2018.

(Continued)

*Primary Examiner* — Kevin M Nguyen
(74) *Attorney, Agent, or Firm* — DLA Piper LLP (US)

(57) ABSTRACT

Provided are a high-performance touch sensor and a method of manufacturing the same. The touch sense includes a substrate, a sense electrode part formed on the substrate, and an insulating layer formed on the sense electrode part. A pitch of a unit sense cell including the sense electrode part is in a range of 50 μm to 70 μm. A dielectric constant of the insulating layer is in a range of 6 to 10. A unit sense cell pitch and a mutual capacitance sufficient for stably identifying a user's fingerprints may be achieved and both light transmittance and visibility may be improved.

16 Claims, 6 Drawing Sheets

(56) References Cited

U.S. PATENT DOCUMENTS

| | | | |
|---|---|---|---|
| 2014/0028570 A1* | 1/2014 | Guard | G06F 3/044 345/173 |
| 2016/0349901 A1* | 12/2016 | Li | G06F 3/0416 |
| 2017/0031522 A1* | 2/2017 | Hong | G06F 3/0416 |
| 2018/0107856 A1* | 4/2018 | Troccoli | G06K 9/0002 |

FOREIGN PATENT DOCUMENTS

| | | |
|---|---|---|
| CN | 104123021 A | 10/2014 |
| CN | 105590110 A | 5/2016 |
| JP | 2010-027294 | 2/2010 |
| KR | 10-1452302 | 10/2014 |
| KR | 10-2016-0038797 | 4/2016 |
| TW | M513748 U | 2/1916 |
| TW | 201327312 A1 | 7/2013 |
| TW | 201510787 A | 3/2015 |
| TW | 201517729 A | 5/2015 |

OTHER PUBLICATIONS

Office Action from counterpart Taiwan Application No. 107106442, and its English Translation, dated Oct. 11, 2018.

* cited by examiner

HIGH-PERFORMANCE TOUCH SENSOR AND MANUFACTURING METHOD THEREOF

CROSS-REFERENCE TO RELATED PATENT APPLICATION

This U.S. non-provisional patent application claims priority under 35 U.S.C. § 119 of Korean Patent Application No. 10-2017-0026052 filed on Feb. 28, 2017 in the Korean Patent Office, the entire contents of which are hereby incorporated by reference.

FIELD OF INVENTION

The present invention relates to a high-performance touch sensor and a method of manufacturing the same. More particularly, the present invention relates to a high-performance touch sensor capable of improving both light transmittance and visibility while securing a unit sense cell pitch and a mutual capacitance sufficient for stably identifying a user's fingerprint, and a method of manufacturing the same.

BACKGROUND

Generally, touch sensors are devices configured to detect the location of a touch when a user touches an image displayed on a screen with a finger, a touch pen, or the like, in response to the touch, and are classified into various types of touch sensors such as a capacitive touch sensor, a resistive touch sensor, and a surface wave touch sensor using infrared rays or ultrasound waves, according to a technology applied thereto.

Generally, such a touch sensor is manufactured to be mounted into a display device such as a liquid crystal display (LCD) device or an organic light-emitting diode (OLED) device. Recently, research has been actively conducted on a film type touch sensor that uses a polymer film as a base film instead of a glass substrate and is thus thin, light, and bendable.

As the field of touch sensors has expanded, there is a need for a high-performance touch sensor capable of performing fingerprint recognition. For fingerprint recognition, a pitch of a unit sense cell of the touch sensor should be appropriate for sensing finely intervaled ridges of a user's fingerprints. However, defective products may occur during manufacture of fine unit sense cells, a desired mutual capacitance Cm directly influencing the sensitivity of the touch sensor is difficult to obtain, and light transmittance and visibility may decrease.

PRIOR-ART DOCUMENT

Patent Document 1

Korea Patent Publication No. 10-2016-0038797, entitled "Photosensitive Resin Composition for Touch Panel, Cured Film thereof, and Touch Panel Including Cured Film" (Publication Date: Apr. 7, 2016).

SUMMARY OF THE INVENTION

Technical Problem

A technical objective of the present invention is to provide a high-performance touch sensor capable of improving both light transmittance and visibility while securing a unit sense cell pitch and a mutual capacitance sufficient for stably identifying a user's fingerprints, and a method of manufacturing the same.

Solution to Problem

A high-performance touch sensor according to the present invention includes a substrate, a sense electrode part formed on the substrate, and an insulating layer formed on the sense electrode part. A pitch of a unit sense cell including the sense electrode part is in a range of 50 µm to 70 µm, and a dielectric constant of the insulating layer is in a range of 6 to 10.

In the high-performance touch sensor according to the present invention, the insulating layer may have a thickness of 1 µm to 2 µm.

In the high-performance touch sensor according to the present invention, the insulating layer may have a refractive index of 1.5 to 2.0.

In the high-performance touch sensor according to the present invention, the unit sense cell may have an area of 2000 $\mu m^2$ to 4000 $\mu m^2$.

In the high-performance touch sensor according to the present invention, the sense electrode part included in the unit sense cell has an area of 2,300 $\mu m^2$ to 2,600 $\mu m^2$.

In the high-performance touch sensor according to the present invention, the substrate may include a soft material or a hard material.

The high-performance touch sensor according to the present invention may further include an isolation layer formed between the substrate and the sense electrode part. The substrate may be a flexible substrate.

The high-performance touch sensor according to the present invention may further include a first protective layer formed between the isolation layer and the sense electrode part.

The high-performance touch sensor according to the present invention may further include a second protective layer formed to cover the sense electrode part and the insulating layer.

In the high-performance touch sensor according to the present invention, the unit sense cell may have a mutual capacitance of 8 fF to 15 fF.

A method of manufacturing a high-performance touch sensor according to the present invention includes forming a sense electrode part on a substrate and forming an insulating layer on the sense electrode part. A pitch of a unit sense cell including the sense electrode part is in a range of 50 µm to 70 µm and a dielectric constant of the insulating layer is in a range of 6 to 10.

In the method of manufacturing a high-performance touch sensor according to the present invention, the insulating layer may have a thickness of 1 µm to 2 µm.

In the method of manufacturing a high-performance touch sensor according to the present invention, the insulating layer may have a refractive index of 1.5 to 2.0.

In the method of manufacturing a high-performance touch sensor according to the present invention, the unit sense cell may have an area of 2000 $\mu m^2$ to 4000 $\mu m^2$.

In the method of manufacturing a high-performance touch sensor according to the present invention, the sense electrode part included in the unit sense cell may have an area of 2,300 $\mu m^2$ to 2,600 $\mu m^2$.

In the method of manufacturing a high-performance touch sensor according to the present invention, the substrate may include a soft material or a hard material.

In the method of manufacturing a high-performance touch sensor according to the present invention, the substrate may be a carrier substrate. The method of manufacturing a high-performance touch sensor according to the present invention may further include forming an isolation layer on the carrier substrate before the forming of the sense electrode part.

The method of manufacturing a high-performance touch sensor according to the present invention may further include forming a first protective layer on the isolation layer.

In the method of manufacturing a high-performance touch sensor according to the present invention, the first protective layer may be formed to cover side walls of the isolation layer.

The method of manufacturing a high-performance touch sensor according to the present invention may further include forming a second protective layer covering the sense electrode part and the insulating layer.

The method of manufacturing a high-performance touch sensor according to the present invention may further include separating the carrier substrate and bonding a base film having flexibility on the isolation layer exposed due to the separation of the carrier substrate.

In the method of manufacturing a high-performance touch sensor according to the present invention, the unit sense cell may have a mutual capacitance of 8 fF to 15 fF.

Advantageous Effects

According to the present invention, a high-performance touch sensor capable of improving both light transmittance and visibility while securing a unit sense cell pitch and a mutual capacitance sufficient for identifying a user's fingerprints; and a method of manufacturing the same can be provided.

DETAILED DESCRIPTION OF THE INVENTION

Figure 1:
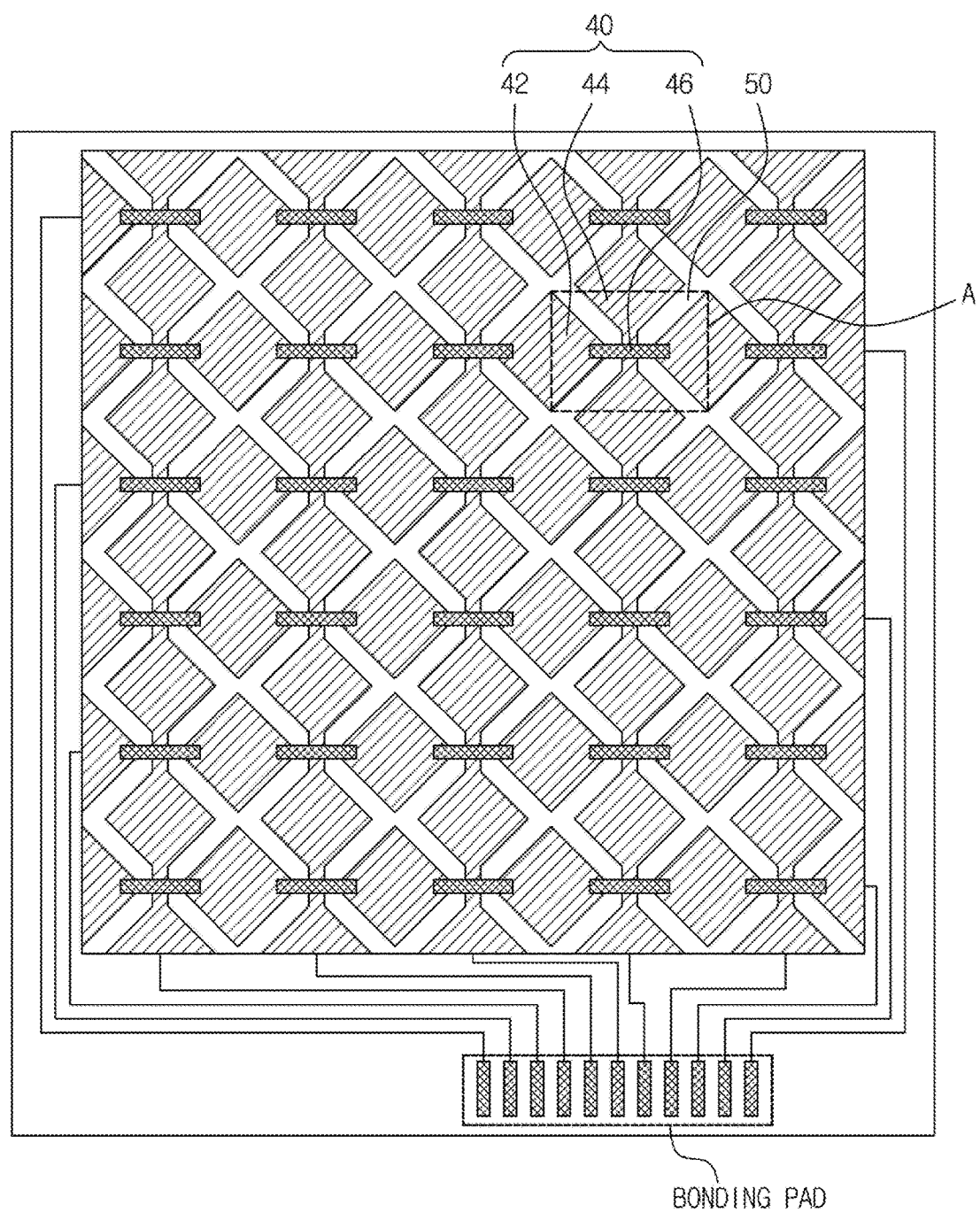
FIG. 1 is a conceptual plan view of a high-performance touch sensor according to an embodiment of the present invention.

As specific structural or functional descriptions for the embodiments according to the concept of the invention disclosed herein are merely exemplified for purposes of describing the embodiments according to the concept of the invention, the embodiments according to the concept of the invention may be embodied in various forms but are not limited to the embodiments described herein.

While the embodiments of the present invention are susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described in detail with reference to the accompanying drawings.

FIG. 1 is a conceptual plan view of a high-performance touch sensor according to an embodiment of the present invention.

Referring to FIG. 1, the high-performance touch sensor according to an embodiment of the present invention may be divided into a display region and a non-display region according to whether visual information is displayed or not.

The display region is not only a region for displaying an image provided from a device coupled to the touch sensor but also a region for sensing a touch signal, which is input by a user, according to an electrostatic capacitance method. The display region includes a sense electrode part 40 having a plurality of sense patterns arranged to intersect each other. For example, as will be described in detail below, the sense electrode part 40 of the touch sensor may include first electrode portions 44 and second electrode portions 42 which intersect each other to be insulated from each other by an insulating layer 50.

In the non-display region located at edges of the display region, a connection line electrically connected to the sense electrode part 40 and a bonding pad electrically connected to the connection line are provided. A flexible printed circuit (FPC) may be connected to the bonding pad to transmit a touch signal sensed in the display region to a driving part (not shown).

Figure 2:
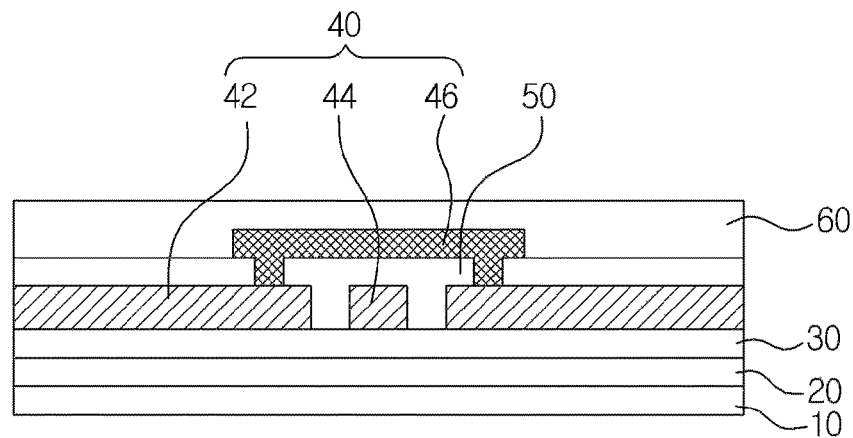
FIG. 2 is a cross-sectional view of a unit sense cell of a high-performance touch sensor according to an embodiment of the present invention.
Figure 3:
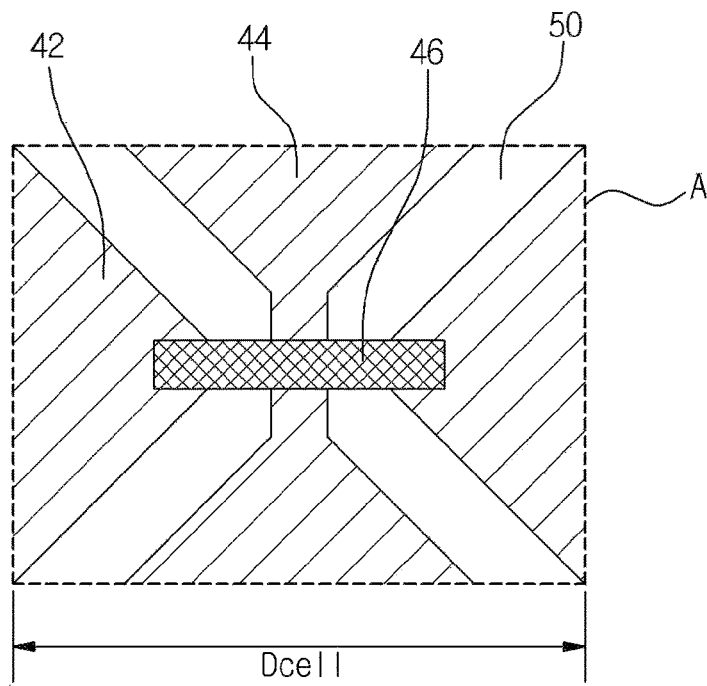
FIG. 3 is an example plan view of a unit sense cell of a high-performance touch sensor according to an embodiment of the present invention.

FIG. 2 is a cross-sectional view of a unit sense cell of a high-performance touch sensor according to an embodiment of the present invention. FIG. 3 is an example plan view of a unit sense cell of a high-performance touch sensor according to an embodiment of the present invention.

Referring to FIGS. 2 and 3, the high-performance touch sensor according to an embodiment of the present invention may include a substrate 10, a sense electrode part 40 formed on the substrate 10, and an insulating layer 50 formed on the sense electrode part 40. A pitch Dcell of a unit sense cell A including the sense electrode part 40 may be in a range of 50 μm to 70 μm. A dielectric constant $\varepsilon_R$ of the insulating layer 50 may be in a range of 6 to 10 and a thickness thereof may be in a range of 1 μm to 2 μm.

The reason why the sense electrode part 40 and the insulating layer 50 are configured as described above will be described below.

The pitch Dcell of the unit sense cell A of the sense electrode part 40 is set to be in a range of 50 μm to 70 μm.

When the pitch Dcell of the unit sense cell A is less than 50 μm, an area of the sense electrode part 40 is small and a resistance value thereof increases, thereby degrading the sensitivity of the touch sensor. When the pitch Dcell of the unit sense cell A is greater than 70 μm, the touch sensor is not capable of precisely sensing fingerprints corresponding to the distances between the ridges of a user's fingers.

When the dielectric constant $\varepsilon_R$ of the insulating layer 50 is set to be in a range of 6 to 10 and the thickness of the insulating layer 50 is set to be in a range of 1 μm to 2 μm, a desired mutual capacitance Cm of the touch sensor may be achieved, the sensitivity of the touch sensor may be improved, and light transmittance and visibility may be improved.

For example, the sensitivity of user fingerprint identification may be improved by setting an area of the unit sense cell A to be in a range of 2000 μm² to 4000 μm². When the area of the unit sense cell A is less than 2000 μm², a process error may occur due to a microfabrication process. When the area of the unit sense cell A is greater than 4000 μm², the resolution of the touch sensor is low, and thus a user's fine fingerprints cannot be precisely identified.

For example, when the area of the sense electrode part 40 included in the unit sense cell A is in a range of 2,300 μm² to 2,600 μm², an appropriate mutual capacitance required to identify a user's fingerprints may be secured and the sensitivity of user fingerprint identification may be improved. When the area of the sense electrode part 40 included in the unit sense cell A is less than 2,300 μm², a mutual capacitance generated due to the components of the sense electrode part 40 and the insulating layer 50 is lower than a suitable level. In contrast, when the area of the sense electrode part 40 included in the unit sense cell A is greater than 2,600 μm², the mutual capacitance increases but a transmittance of the unit sense cell A is low, and thus a transparent display is difficult to achieve.

For example, a mutual capacitance Cm of the unit sense cell A may be in a range of 8 fF to 15 fF. When the mutual capacitance Cm of the unit sense cell A is in the range of 8 fF to 15 fF, the pitch Dcell of the unit sense cell A may be set to a level at which a user's fingerprints may be precisely identified and the sensitivity of fingerprint identification may be improved.

For example, a refractive index of the insulating layer 50 may be in a range of 1.5 to 2.0. When the refractive index of the insulating layer 50 is in the range of 1.5 to 2.0, a light transmittance and visibility of the touch sensor may improve.

For example, the substrate 10 may be formed of a hard or soft material.

Although a case in which the substrate 10 is formed of the soft material will be described as an example below, the substrate 10 may be formed of a hard material such as glass.

For example, the substrate 10 formed of the soft material may be a transparent optical film or a polarizing plate.

The transparent optical film may be a film which is transparent and has high mechanical strength and high thermal stability. As a concrete example, the transparent optical film may be a film formed of thermoplastic resin, e.g., polyester-based resin such as polyethylene terephthalate, polyethylene isophthalate, polyethylene naphthalate, or polybutylene terephthalate; cellulose-based resin such as diacetyl cellulose or triacetyl cellulose; polycarbonate-based resin; acryl-based resin such as polymethyl(meta)acrylate or polyethyl(meta)acrylate; styrene-based resin such as polystyrene or acrylonitrile-styrene copolymer; polyolefin-based resin such as polyethylene, polypropylene, cyclo-based polyolefin, norbornene polyolefin, or ethylene-propylene copolymer; vinylchloride-based resin; amide-based resin such as nylon or aromatic polyamide; imide-based resin; polyethersulfone-based resin; sulfone-based resin; polyether ether ketone-based resin; polyphenylene sulfide-based resin; vinylalcohol-based resin; vinylchloride lidene-based resin; vinylbutyral-based resin; allylate-based resin; polyoxymethylene-based resin; or epoxy-based resin. Alternatively, the transparent optical film may be a film formed of a blend of some of the thermoplastic resins described above. Alternatively, the transparent optical film may be a film formed of thermosetting resin such as (meta)acryl-based resin, urethane-based resin, acryl urethane-based resin, epoxy-based resin, or silicon-based resin, or ultraviolet (UV) curing resin. A thickness of the transparent optical film may be appropriately determined but may be generally determined to be in a range of 1 to 500 μm in consideration of strength, workability characteristics such as convenience of use, thin-film quality, etc. In particular, a thickness of the transparent optical film may be preferably in a range of 1 to 300 μm and more preferably in a range of 5 to 200 μm.

The transparent optical film may contain one or more types of appropriate additives. The additives may be, for example, a UV absorber, an anti-oxidant, a lubricant, a plasticizer, a releasing agent, an anti-coloring agent, a flame retardant, a nucleating agent, an anti-static agent, a pigment, a coloring agent, etc. The transparent optical film may have a structure in which various functional layers such as a hard coating layer, an anti-reflective layer, and a gas barrier layer is formed on one or opposite surfaces of a film. The functional layers are not limited thereto and various other functional layers may be provided according to usage.

A surface treatment may be performed on the transparent optical film if necessary. Examples of the surface treatment may include a dry treatment such as a plasma treatment, a corona treatment, or a primer treatment, a chemical treatment such as an alkali treatment, e.g., a saponification treatment, etc.

Alternatively, the transparent optical film may be an isotropic film, a phase-difference film, or a protective film.

When the transparent optical film is the isotropic film, an in-plane phase difference (Ro, Ro=[(nx−ny)×d], nx and ny represent principal indices of refraction within a plane of the film, and d represents a thickness of the film) may be 40 nm or less, preferably 15 nm or less, and a thickness-wise phase difference (Rth, Rth=[(nx+ny)/2−nz]×d, nx and ny represent principal indices of refraction within the plane of the film, nz represents an index of refraction in a direction of the thickness of the film, and d represents the thickness of the film) may be in a range of −90 nm to +75 nm, preferably in a range of −80 nm to +60 nm, and more preferably in a range of −70 nm to +45 nm.

The phase-difference film may be a uniaxially oriented polymer film, a biaxially oriented polymer film, a polymer-coated film, or a film manufactured by coating liquid crystal, and is generally used to perform optical feature enhancement and control, e.g., viewing-angle compensation, color enhancement, light leakage improvement, fine color control, etc. on a display. Examples of a phase difference film include a half-wave plate, a quarter-wave plate, a positive C-plate, a negative C-plate, a positive A-plate, a negative A-plate, a biaxial wave plate, etc.

The protective film may be a film formed of polymer resin and having an adhesive layer on at least one surface thereof or a self-adhesive film formed of polypropylene or the like, and may be used to protect a surface of the touch sensor and improve a process of the touch sensor process.

A well-known polarizing plate for use in a display panel may be used as the polarizing plate. In detail, the polarizing plate may be manufactured by elongating a polyvinyl alcohol film and forming a protective layer on at least one surface of a polarizer dyed with iodine or a dichroic pigment, manufactured by orienting liquid crystal so that the liquid crystal achieves the performance of a polarizer, or manufactured by coating a transparent film with oriented resin such as polyvinyl alcohol and elongating and dying the resultant transparent film, but is not limited thereto.

For example, the substrate 10 may have flexibility. The high-performance touch sensor according to an embodiment of the present invention may further include an isolation layer 20 located between the substrate 10 and the sense electrode part 40.

The isolation layer 20 is a layer formed to be separated from a carrier substrate (see reference numeral 10 in FIGS. 7 to 13) during the manufacture of the high-performance touch sensor according to an embodiment of the present invention.

A material of the isolation layer 20 is not limited, provided that levels of peel strength and transparency of the material satisfy certain levels. For example, the isolation layer 20 may be formed of polyimide-based polymer, poly vinyl alcohol-based polymer, polyamic acid-based polymer, polyamide-based polymer, polyethylene-based polymer, polystyrene-based polymer, polynorbornene-based polymer, phenylmaleimide copolymer-based polymer, polyazobenzene-based polymer, polyphenylenephthalamide-based polymer, polyester-based polymer, polymethyl methacrylate-based polymer, polyarylate-based polymer, cinnamate-based polymer, coumarin-based polymer, phthalimidine-based polymer, chalcone-based polymer, aromatic acetylene-based polymer, or a mixture thereof.

The peel strength of the isolation layer 20 is not limited but may be, for example, in a range of 0.01 N/25 mm to 1 N/25 mm, preferably in a range of 0.01 N/25 mm to 0.1 N/25 mm. When the above-described ranges are satisfied, the isolation layer 20 may be easily separated from the carrier substrate without generating residue, and curls and cracks generated due to tension applied when the isolation layer 20 is separated may decrease during the manufacture of the touch sensor.

A thickness of the isolation layer 20 is not limited but may be, for example, in a range of 10 to 1,000 nm, preferably in a range of 50 to 500 nm. When this range is satisfied, a uniform pattern having stable peel strength may be formed.

For example, the high-performance touch sensor according to an embodiment of the present invention may further include a first protective layer 30 located between the isolation layer 20 and the sense electrode part 40.

The first protective layer 30 is located between the isolation layer 20 and the sense electrode part 40, and is an optional component which may be omitted if necessary. The first protective layer 30 may protect the sense electrode part 40 together with the isolation layer 20, and may prevent the isolation layer 20 from being exposed to an etchant used to form the sense electrode part 40 during the manufacture of the high-performance touch sensor according to an embodiment of the present invention.

Various types of polymers well known in the art may be used as a material of the first protective layer 30. For example, an organic insulating film may be applied as the first protective layer 30, and particularly, the first protective layer 30 may be formed of polyol and a curing composition containing a melamine hardener but is not limited thereto.

Examples of polyol may include, but are not limited to, a polyether glycol derivative, a polyester glycol derivative, a polycaprolactone glycol derivative, and the like.

Examples of the melamine hardener may include, but are not limited to, a methoxy methyl melamine derivative, a methyl melamine derivative, a butyl melamine derivative, an isobutoxy melamine derivative, a butoxy melamine derivative, and the like.

As another example, the first protective layer 30 may be formed of an organic or inorganic hybrid curing composition. When both an organic compound and an inorganic compound are used, cracks occurring during layer separation may decrease.

The above-described components may be used as the organic compound. Examples of the inorganic material may include, but are not limited to, silica-based nanoparticles, silicon-based nanoparticles, glass nanoparticles, and the like.

The sense electrode part 40 is formed on the first protective layer 30, and is a component configured to sense a touch signal input by a user.

For example, the plurality of sense patterns of the sense electrode part 40 may have an appropriate shape according to a request from an electronic device to which the touch sensor is applied. For example, when the touch sensor is applied to a touch screen panel, the plurality of sense patterns may include two types of patterns such as an x-coordinate sense pattern and a y-coordinate sense pattern but are not limited thereto.

For example, the sense electrode part 40 may include the first electrode portions 44, the second electrode portions 42, and a bridge electrode portion 46.

The first electrode portions 44 may be formed in a first direction to be electrically connected to each other. The second electrode portions 42 may be formed in a second direction to be electrically disconnected from each other. The second direction crosses the first direction. For example, when the first direction is an X-axis direction, the second direction may be a Y-axis direction. The first electrode portions 44 and the second electrode portions 42 are electrically insulated from each other by the insulating layer 50.

For example, in order to reduce a sheet resistance, at least one among the first and second electrode portions 44 and 45 may have a multilayer film structure, more particularly a three-layer film structure including a metal oxide, a metal, and a metal oxide.

The bridge electrode portion 46 electrically connects adjacent second electrode portions 42 to each other.

Any transparent conductive material may be used to form the first electrode portions 44, the second electrode portions 42, and the bridge electrode portion 46. For example, the first electrode portions 44, the second electrode portions 42, and the bridge electrode portion 46 may be formed of a metal oxide selected from the group consisting of indium tin oxide (ITO), an indium zinc oxide (IZO), an indium zinc tin oxide (IZTO), aluminum zinc oxide (AZO), gallium zinc oxide (GZO), fluorine tin oxide (FTO), indium tin oxide-silver-indium tin oxide (ITO-Ag-ITO), indium zinc oxide-silver-indium zinc oxide (IZO-Ag-IZO), indium zinc tin oxide-silver-indium zinctin oxide (IZTO-Ag-IZTO), and aluminum zinc oxide-silver-aluminum zinc oxide (AZO-Ag-AZO); a metal selected from the group consisting of gold (Au), silver (Ag), copper (Cu), molybdenum (Mo), and APC; a nanowire of a metal selected from the group consisting of gold, silver, copper, and lead; a carbon-based material selected from the group consisting of carbon nanotube (CNT) and graphene; and a conductive polymer material selected from the group consisting of poly(3,4-ethylenedioxythiophene) (PEDOT) and polyaniline (PANT). These materials may be used solely or in a mixture of two or more thereof. Preferably, indium tin oxide may be used. Crystalline or amorphous indium tin oxide may be used.

A thickness of the sense electrode part 40 is not limited but the sense electrode part 40 is preferably a thin film when the flexibility of the touch sensor is taken into account.

For example, the first electrode portions 44 and the second electrode portions 42 of the sense electrode part 40 may each have a polygonal shape such as a triangular shape, a tetragonal shape, a pentagonal shape, a hexagonal shape, or a heptagonal shape.

For example, the first electrode portions 44 or the second electrode portions 42 may be formed in a stripe pattern.

Alternatively, the sense electrode part 40 may include regular patterns. The regular patterns should be understood as patterns having regularity. For example, the sense patterns may include independent mesh shapes such as rectangles or squares or include patterns such as hexagons.

Alternatively, the sense electrode part 40 may include irregular patterns. Irregular patterns should be understood as patterns having no regularity.

When the sense patterns of the sense electrode part 40 are formed of, for example, metal wires, a carbon-based material, a polymer material, or the like, the sense patterns may have a network structure. When the sense patterns have the network structure, a signal is sequentially transmitted to adjacent patterns which are in contact with each other, and thus the sense patterns having high sensitivity may be achieved.

For example, the sense patterns of the sense electrode part 40 may be formed in a single layer or multiple layers.

Various types of insulating materials well known in the art may be used as a material of the insulating layer 50 insulating the first electrode portions 44 and the second electrode portions 42 from each other. For example, a metal oxide such as a silicon oxide, photosensitive resin composition such as acryl-based resin, or a thermosetting resin composition may be used. Alternatively, the insulating layer 50 may be formed of an inorganic material such as silicon oxide (SiOx). In this case, the insulating layer 50 may be formed by deposition, sputtering, or the like.

For example, the high-performance touch sensor according to an embodiment of the present invention may further include a second protective layer 60 formed to cover the sense electrode part 40 and the insulating layer 50.

The second protective layer 60 may be formed of an insulating material, and may be formed to cover the first electrode portions 44, the second electrode portions 42, and the bridge electrode portion 46 of the sense electrode part 40, thereby protecting and insulating the sense electrode part 40 from the outside.

Various types of insulating materials well known in the art may be used as a material of the second protective layer 60. For example, a metal oxide such as a silicon oxide, photosensitive resin composition such as acryl-based resin, or a thermosetting resin composition may be used. Alternatively, the second protective layer 60 may be formed of an inorganic material such as silicon oxide (SiOx). In this case, the second protective layer 60 may be formed by deposition, sputtering, or the like.

Figure 4:
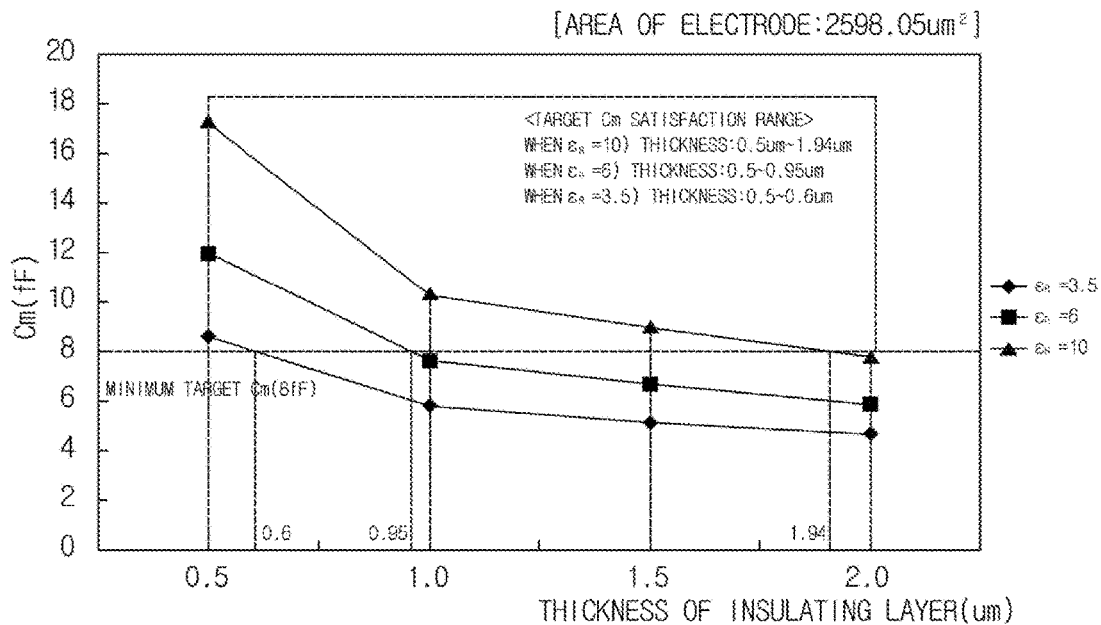
FIGS. 4 and 5 are of experimental data showing mutual capacitance in relation to an area of a sense electrode part and to a thickness and a dielectric constant of an insulating layer, according to an embodiment of the present invention.
Figure 5:
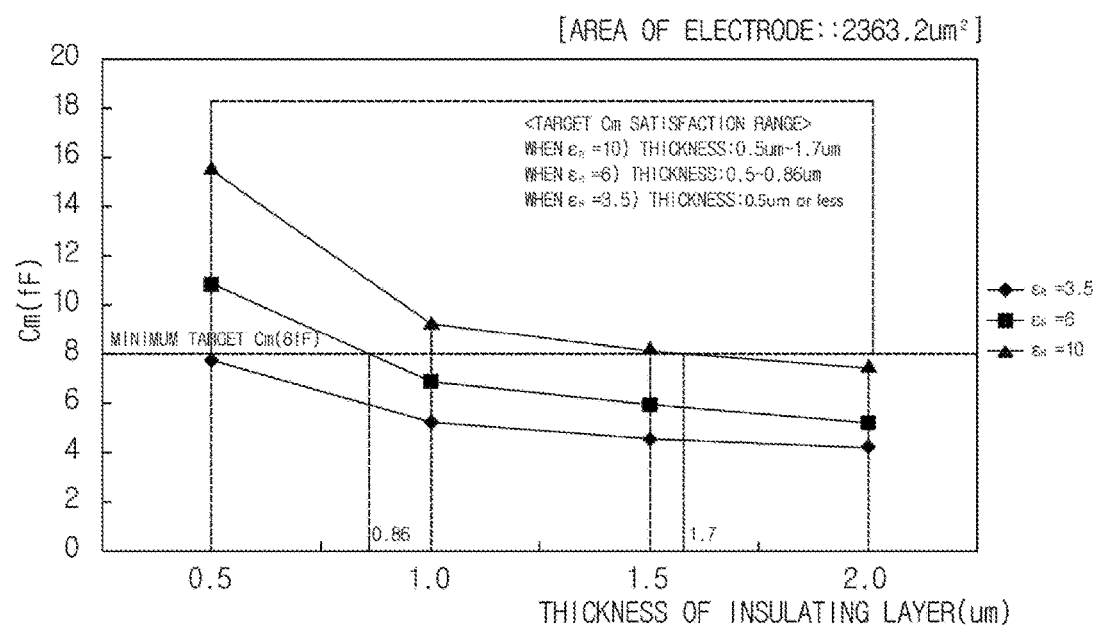

FIGS. 4 and 5 are of experimental data showing mutual capacitance Cm in relation to an area of the sense electrode part 40 and to a thickness and a dielectric constant of the insulating layer 50, according to an embodiment of the present invention.

FIG. 4 illustrate a thickness of the insulating layer 50 satisfying a target mutual capacitance Cm of the unit sense cell A when an area of the sense electrode part 40 included in the unit sense cell A was 2598.05 μm² and a dielectric constant $\varepsilon_R$ of the insulating layer 50 was 3.5, 6, or 10.

In FIG. 4, a horizontal axis of the graph represents a thickness of the insulating layer 50 expressed in units of μm, a vertical axis of the graph denotes a mutual capacitance of the unit sense cell A expressed in a unit of fF, and the target mutual capacitance was 8 fF. As illustrated in FIG. 4, when the dielectric constant $\varepsilon_R$ of the insulating layer 50 was 10, a thickness of the insulating layer 50 satisfying the target mutual capacitance of 8 fF was in a range of 0.5 to 1.94 μm. When the dielectric constant $\varepsilon_R$ of the insulating layer 50 was 6, a thickness of the insulating layer 50 satisfying the target mutual capacitance of 8 fF was in a range of 0.5 to 0.95 μm. When the dielectric constant $\varepsilon_R$ of the insulating layer 50 was 3.5, a thickness of the insulating layer 50 satisfying the target mutual capacitance of 8 fF was in a range of 0.5 to 0.6 μm.

FIG. 5 illustrates a thickness of the insulating layer 50 satisfying the target mutual capacitance Cm of the unit sense cell A when the area of the sense electrode part 40 included in the unit sense cell A was 2363.2 μm² and the dielectric constant $\varepsilon_R$ of the insulating layer 50 was 3.5, 6, or 10.

In FIG. 5, a horizontal axis of the graph represents a thickness of the insulating layer 50, expressed in units of μm, a vertical axis of the graph denotes a mutual capacitance of the unit sense cell A, expressed in units of fF, and the target mutual capacitance was 8 fF. As illustrated in FIG. 5, when the dielectric constant $\varepsilon_R$ of the insulating layer 50 was 10, a thickness of the insulating layer 50 satisfying the target mutual capacitance of 8 fF was in a range of 0.5 to 1.7 μm. When the dielectric constant $\varepsilon_R$ of the insulating layer 50 was 6, a thickness of the insulating layer 50 satisfying the target mutual capacitance of 8 fF was in a range of 0.5 to 0.86 μm. When the dielectric constant $\varepsilon_R$ of the insulating layer 50 was 3.5, a thickness of the insulating layer 50 satisfying the target mutual capacitance of 8 fF was 0.5 μm or less.

Figure 6:
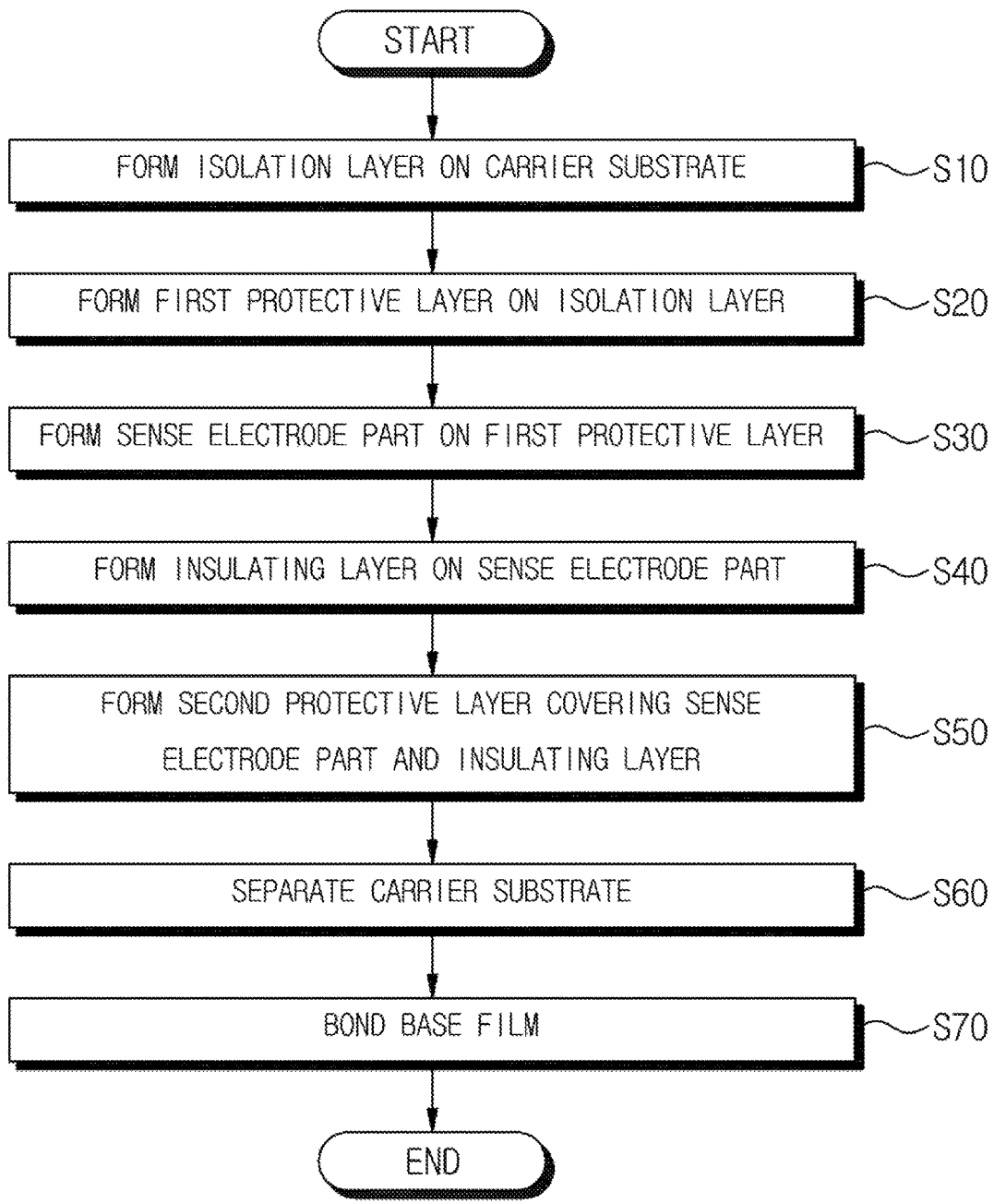
FIG. 6 is a flowchart of a method of manufacturing a high-performance touch sensor according to an embodiment of the present invention.

FIG. 6 is a flowchart of a method of manufacturing a high-performance touch sensor according to an embodiment of the present invention. FIGS. 7 to 14 are cross-sectional views illustrating a method of manufacturing a high-performance touch sensor according to an embodiment of the present invention.

Referring to FIGS. 6 to 14, a method of manufacturing a high-performance touch sensor according to an embodiment of the present invention includes forming an isolation layer (operation S10), forming a first protective layer (operation S20), forming a sense electrode part (operation S30), forming an insulating layer (operation S40), forming a second protective layer (operation S50), separating a carrier substrate (operation S60), and bonding a base film (operation S70). A substrate may be formed of a soft or hard material. In the following description, embodiments will be described with respect to a case in which a substrate is a base film having flexibility, the technical idea of the present invention is not limited thereto, and the substrate may be formed of a hard material such as glass. When the substrate is formed of a hard material such as glass, the forming of the isolation layer (operation S10), the forming of the first protective layer (operation S20), the separating of the carrier substrate (S60), and the bonding of the base film (operation S70) which will be described below are optional.

Figure 7:
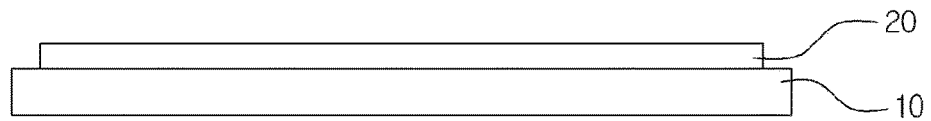
FIGS. 7 to 14 are cross-sectional views illustrating a method of manufacturing a high-performance touch sensor according to an embodiment of the present invention.

Referring to FIGS. 6 and 7, in the forming of the isolation layer (operation S10), an isolation layer 20 is formed on a carrier substrate 10.

The isolation layer 20 is a layer formed to separate a touch sensor formed on the carrier substrate 10 from the carrier substrate 10.

Peel strength of the isolation layer 20 is not limited but may be, for example, in a range of 0.01 N/25 mm to 1 N/25 mm, preferably in a range of 0.01 N/25 mm to 0.1 N/25 mm. When this range is satisfied, the isolation layer 20 may be easily separated from the carrier substrate without generating residue, and curls and cracks generated due to tension applied when the isolation layer 20 is separated may decrease during the manufacture of the touch sensor.

A thickness of the isolation layer 20 is not limited but may be, for example, in a range of 10 to 1,000 nm, preferably in a range of 50 to 500 nm. When this range is satisfied, a uniform pattern having stable peel strength may be formed.

For example, a material of the carrier substrate 10 is not limited, provided that the material is strong enough to maintain the carrier substrate 10 without being easily bent or warped during the manufacture of the touch sensor and is nearly unaffected by heat or a chemical treatment. For example, glass, quartz, a silicon waver, steel use stainless (SUS), or the like may be used.

Figure 8:
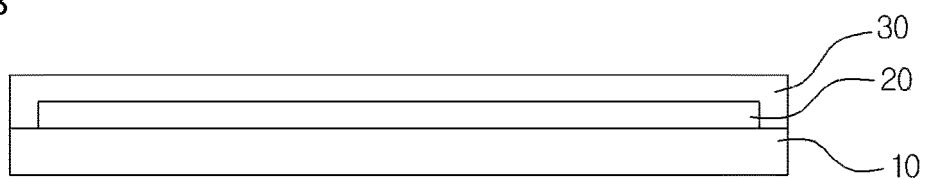

Referring to FIGS. 6 and 8, in the forming of the first protective layer (operation S20), a first protective layer 30 is formed on the isolation layer 20.

For example, the first protective layer 30 may be formed to cover at least a region of side surfaces of the isolation layer 20. The side surfaces of the isolation layer 20 should be understood to mean side walls of edges of the isolation layer 20. When the first protective layer 30 is formed as described above, exposing the side surfaces of the isolation layer 20 to an etchant may be minimized during patterning of first electrode portions 44 and second electrode portions 42 having conductive properties of the sense electrode part 40. In order to completely protect against exposure of the side surfaces of the isolation layer 20, the first protective layer 30 is preferably configured to completely cover sidewalls or the side surfaces of the isolation layer 20.

Referring to FIGS. 6 and 9 to 11, in the forming of the sense electrode part (operation S30), the sense electrode part 40 of FIG. 2 is formed on the first protective layer 30. In the forming of the insulating layer (operation S40), an insulating layer 50 is formed on the sense electrode part 40.

The sense electrode part 40 is a component configured to sense a touch signal input by a user.

For example, sense patterns of the sense electrode part 40 may be formed in a shape according to an electronic device to which the touch sensor is applied. For example, when applied to a touch screen panel, two types of patterns such as an x-coordinate sense pattern and a y-coordinate sense pattern may be formed, but embodiments are not limited thereto.

The forming of the sense electrode part (operation S30) and the forming of the insulating layer (operation S40) will be described in detail with reference to FIGS. 9 to 11 below.

Figure 9:
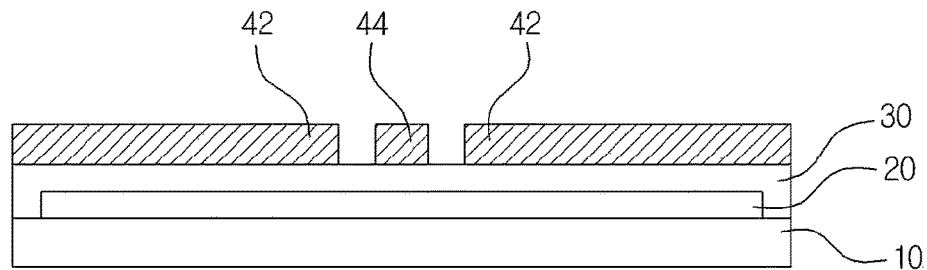

First, referring to FIG. 9, forming of the first electrode portions 44 connected to each other in a first direction and the second electrode portions 42 separated from each other in a second direction crossing the first direction is performed. For example, when the first direction is an X-axis direction, the second direction may be a Y-axis direction.

Figure 10:
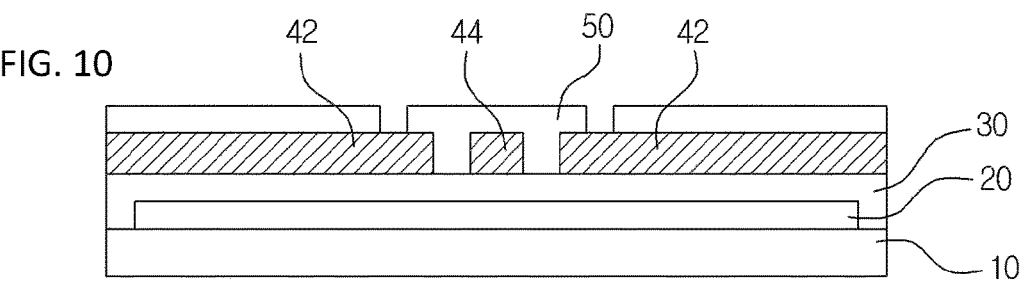

Next, referring to FIG. 10, the forming of the insulating layer 50 between the first electrode portions 44 and the second electrode portions 42 is performed.

The insulating layer 50 electrically insulates the first electrode portions 44 and the second electrode portions 42 from each other.

Figure 11:
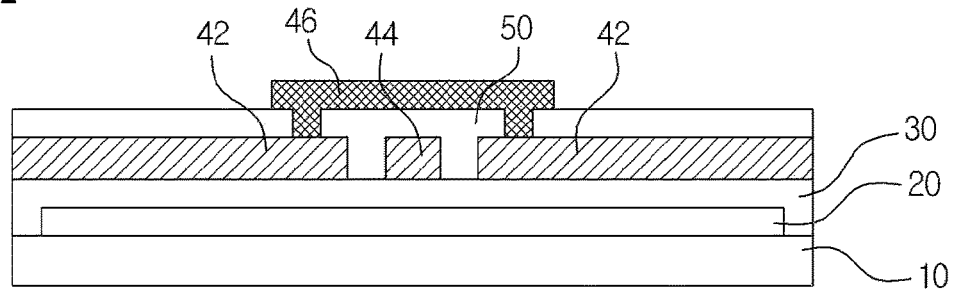
Figure 12:
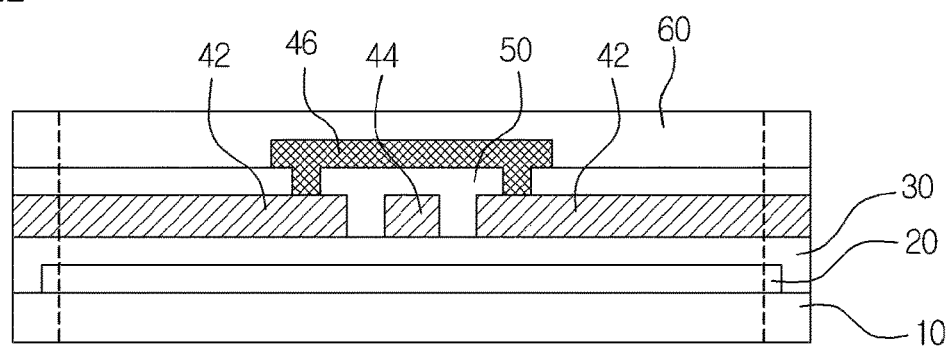
Figure 13:
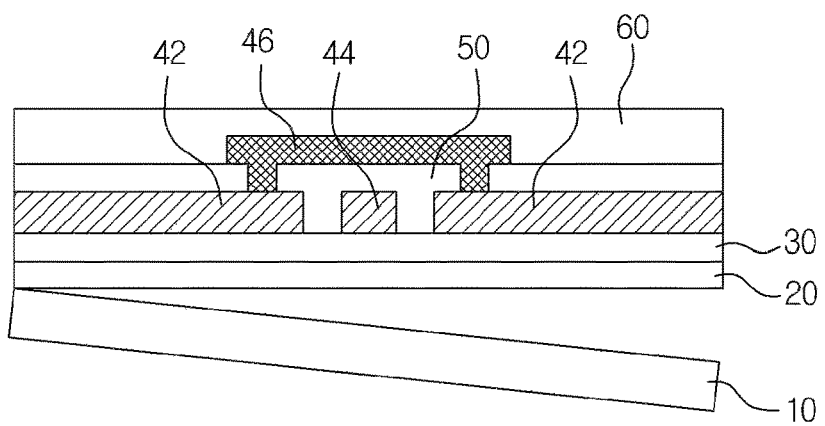
Figure 14:
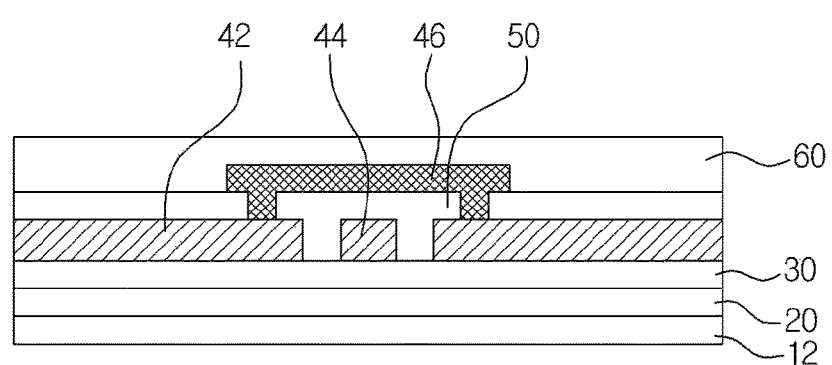

Next, referring to FIG. 11, forming of a bridge electrode portion 46 electrically connecting adjacent second electrode portions 42 is performed.

For example, the first electrode portions 44 and the second electrode portions 42 of the sense electrode part 40 may be independent polygonal patterns such as triangular shape patterns, tetragonal shape patterns, pentagonal shape patterns, hexagonal shape patterns, or heptagonal shape patterns.

Alternatively, for example, the first electrode portions 44 or the second electrode portions 42 may be formed in stripe patterns.

Alternatively, for example, the sense electrode part 40 may include regular patterns. Regular patterns should be understood as patterns having regularity. For example, the sense patterns may include independent mesh shapes such as rectangles or squares or include patterns such as hexagons.

Alternatively, for example, the sense electrode part 40 may include irregular patterns. Irregular patterns should be understood as patterns having no regularity.

Alternatively, for example, when the sense patterns of the sense electrode part 40 are formed of, for example, metal wires, a carbon-based material, a polymer material, or the like, the sense patterns may have a network structure. When the sense patterns have the network structure, a signal is sequentially transmitted to adjacent patterns which are in contact with each other, and thus the sense patterns having high sensitivity may be achieved.

For example, the sense patterns of the sense electrode part 40 may be formed in a single layer or multiple layers.

A pitch Dcell of a unit sense cell A including the sense electrode part 40 is set to be in a range of 50 μm to 70 μm.

When the pitch Dcell of the unit sense cell A is less than 50 μm, the sense electrode part 40 has a small area and an increased resistance value, thereby decreasing sensitivity. When the pitch Dcell of the unit sense cell A is greater than 70 µm, the touch sensor is not capable of precisely identifying fingerprints corresponding to the distances between ridges of a user's fingers.

When a dielectric constant $\varepsilon_R$ of the insulating layer 50 is in a range of 6 to 10 and a thickness of the insulating layer 50 is in a range of 1 µm to 2 µm, a desired mutual capacitance Cm of the touch sensor may be obtained, the sensitivity of the touch sensor may be improved, and light transmittance and visibility may be improved.

For example, when the unit sense cell A has an area of 2000 µm² to 4000 µm², a sensitivity of user fingerprint identification may be improved. When the area of the unit sense cell A is less than 2000 µm², a process error may occur due to a microfabrication process. When the area of the unit sense cell A is greater than 4000 µm², a resolution is low, and thus a user's minute fingerprints are difficult to precisely identify.

For example, when the sense electrode part 40 included in the unit sense cell A has an area of 2,300 µm² to 2,600 µm², a suitable mutual capacitance required to identify the user's fingerprints or the like may be achieved and the sensitivity of user fingerprint identification may be improved. When the sense electrode part 40 included in the unit sense cell A has an area of less than 2,300 µm², a mutual capacitance generated due to the components of the sense electrode part 40 and the insulating layer 50 may be lower than a suitable level. In contrast, when the sense electrode part 40 included in the unit sense cell A has an area of greater than 2,600 µm², the mutual capacitance may increase but a transmittance of the unit sense cell A may be low, thereby preventing a transparent display from being achieved.

For example, the mutual capacitance Cm of the unit sense cell A may be in a range of 8 fF to 15 fF. In this case, the pitch Dcell of the unit sense cell A may be set to a level at which a user's fingerprints can be precisely identified and the sensitivity of fingerprint identification may be improved.

For example, a refractive index of the insulating layer 50 may be in a range of 1.5 to 2.0. In this case, a light transmittance and visibility of the touch sensor may be improved.

In the forming of the second protective layer (operation S50), a second protective layer 60 covering the sense electrode part 40 and the insulating layer 50 is formed.

For example, after the forming of the second protective layer (operation S50), a cutting process may be performed on outer sides of the touch sensor. However, the cutting process not limited to being performed then, and the cutting process may be performed between the forming of the second protective layer (operation S50) and the separating of the carrier substrate (operation S60).

Furthermore, for example, the second protective layer 60 may be formed such that a surface opposite to a surface which is in contact with the sense electrode part 40 is flat, and may be formed in a single layer or in two or more layers.

In the separating of the carrier substrate (operation S60), the carrier substrate 10 is separated from the isolation layer 20.

For example, in the separating of the carrier substrate (operation S60), the carrier substrate 10 may be separated from the isolation layer 20 using a physical force in a state in which the second protective layer 60 is being gripped by a delamination instrument.

In the bonding of the base film (S70), a base film 12 having flexibility is bonded onto the isolation layer 20, which becomes exposed due to the separation of the carrier substrate 10 using, for example, a lamination method.

As described above in detail, according to the present invention, it is possible to provide a high-performance touch sensor capable of securing a unit sense cell pitch and a mutual capacitance sufficient for stably identifying a user's fingerprints and improving both light transmittance and visibility, and a method of manufacturing the same.

DESCRIPTION OF SYMBOLS

10: substrate
20: isolation layer
30: first protective layer
40: sense electrode part
42: second electrode portion
44: first electrode portion
46: bridge electrode portion
50: insulating layer
60: second protective layer
S10: forming isolation layer
S20: forming first protective layer
S30: forming sense electrode part
S40: forming insulating layer
S50: forming second protective layer
S60: separating carrier substrate
S70: bonding base film
A: unit sense cell.

The invention claimed is:

1. A high-performance touch sensor comprising:
a substrate;
a sense electrode part formed on the substrate;
an insulating layer formed on the sense electrode part;
an isolation layer formed between the substrate and the sense electrode part;
a first protective layer formed between the isolation layer and the sense electrode part; and
a second protective layer formed to cover the sense electrode part and the insulating layer,
wherein a pitch of a unit sense cell including the sense electrode part is in a range of 50 µtm to 70 µtm, and
a dielectric constant of the insulating layer is in a range of 6 to 10
wherein a material of the insulating layer is acryl-based resin.

2. The high-performance touch sensor according to claim 1, wherein the insulating layer has a thickness of 1 µm to 2 µm.

3. The high-performance touch sensor according to claim 1, wherein the insulating layer has a refractive index of 1.5 to 2.0.

4. The high-performance touch sensor according to claim 1, wherein the unit sense cell has an area of 2000 µm² to 4000 µm².

5. The high-performance touch sensor according to claim 1, wherein the sense electrode part included in the unit sense cell has an area of 2,300 µm² to 2,600 µm².

6. The high-performance touch sensor according to claim 1, wherein the substrate comprises a soft material or a hard material.

7. The high-performance touch sensor according to claim 1, wherein the substrate comprises a flexible substrate.

8. The high-performance touch sensor according to claim 1, wherein the unit sense cell has a mutual capacitance of 8 fF to 15 fF.

9. A method of manufacturing a high-performance touch sensor, the method comprising:

forming an isolation layer on a carrier substrate;
forming a first protective later on the isolation layer;
forming a sense electrode part on the carrier substrate;
forming an insulating layer on the sense electrode part;
forming a second protective layer covering the sense electrode part and the insulating layer;
separating the carrier substrate; and
bonding a base film having flexibility on the isolation layer exposed due to the separation of the carrier substrate,
wherein a pitch of a unit sense cell including the sense electrode part is in a range of 50 μm to 70 μm, and
a dielectric constant of the insulating layer is in a range of 6 to 10,
wherein a material of the insulating layer is acryl-based resin.

10. The method according to claim 9, wherein the insulating layer has a thickness of 1 μm to 2 μm.

11. The method according to claim 9, wherein the insulating layer has a refractive index of 1.5 to 2.0.

12. The method according to claim 9, wherein the unit sense cell has an area of 2000 μm$^2$ to 4000 μm$^2$.

13. The method according to claim 9, wherein the sense electrode part included in the unit sense cell has an area of 2,300 μm$^2$ to 2,600 μm$^2$.

14. The method according to claim 9, wherein the substrate comprises a soft material or a hard material.

15. The method according to claim 9, wherein the first protective layer is formed to cover side walls of the isolation layer.

16. The method according to claim 9, wherein the unit sense cell has a mutual capacitance of 8 fF to 15 fF.

* * * * *